United States Patent [19]

Evans

[11] 3,868,875

[45] Mar. 4, 1975

[54] QUICK ADJUSTABLE WRENCH

[76] Inventor: James P. Evans, 3233 S.W. 23 St., Oklahoma City, Okla.

[22] Filed: Sept. 17, 1973

[21] Appl. No.: 397,630

[52] U.S. Cl. .................................................. 81/158
[51] Int. Cl. ............................................ B25b 13/16
[58] Field of Search ............ 81/129, 137, 155, 157, 81/162, 176, DIG. 3, 158

[56] References Cited
UNITED STATES PATENTS
1,467,978  9/1923  Nicholson ............................. 81/137

FOREIGN PATENTS OR APPLICATIONS
11,525   2/1898  Great Britain ....................... 81/137
451,318  4/1913  France ................................. 81/162
698,313  1/1931  France ................................. 81/157

Primary Examiner—Al Lawrence Smith
Assistant Examiner—James G. Smith
Attorney, Agent, or Firm—Head & Johnson

[57] ABSTRACT

A quick adjustable wrench having a body with a handle and a fixed jaw, a rack portion formed on said body portion providing spaced apart teeth, the floors of the valley areas between the teeth having irregular surfaces, a movable jaw slidably supported to the body providing variable spacing between said jaws, an eccentric axis supported by the movable jaw, a worm member rotatably supported by the eccentrix axis, the worm member having a spiralled tooth thereon, the outer surface of the thread being irregular, and means of rotatably positioning the eccentric axis to three positions, in the first position the thread of the worm member being out of engagement with the rack portion so that the movable jaw may be rapidly positioned relative to the fixed jaw, in the second position the threads of the worm member engaging teeth of the rack portion so that the movable jaw may be threadably positioned by the rotation of the worm member and in the third position the worm member being fully positioned towards the rack portion, the irregular outer surface of the worm member thread engaging the irregular floors of the valley areas between the teeth of the rack portion so that the worm member is prevented from rotation to thereby lock the movable jaw to the body portion.

12 Claims, 10 Drawing Figures

PATENTED MAR 4 1975
3,868,875
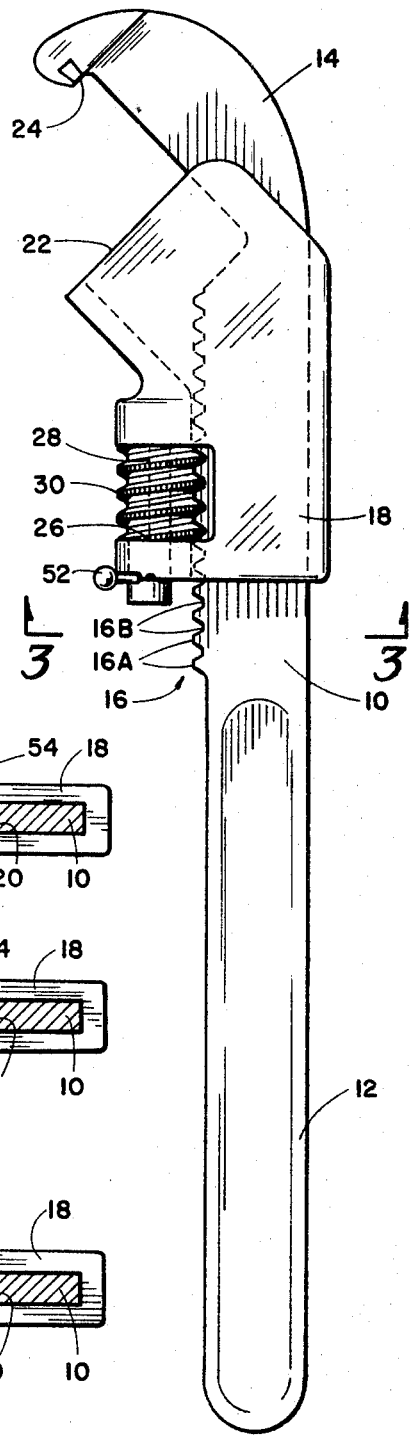
Fig. 1
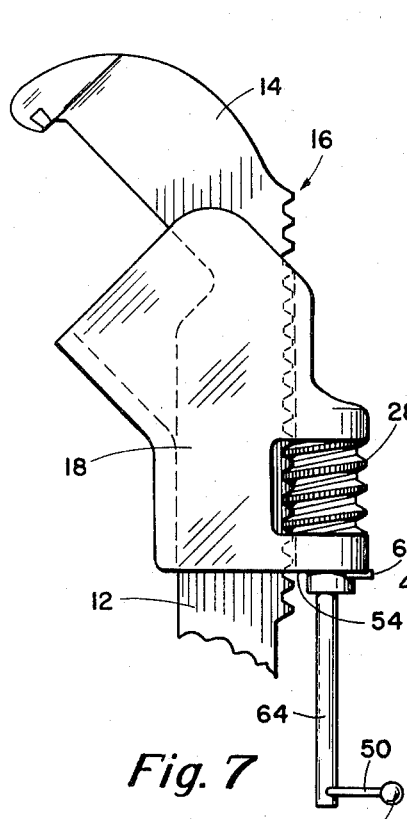
Fig. 7
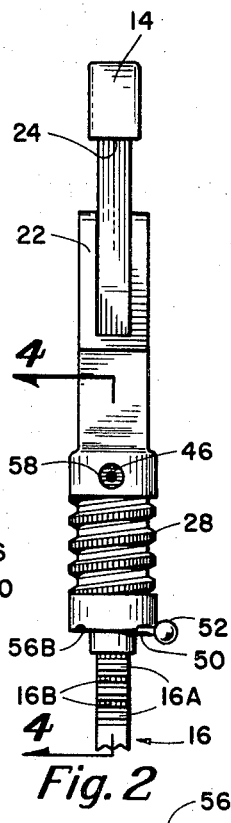
Fig. 2
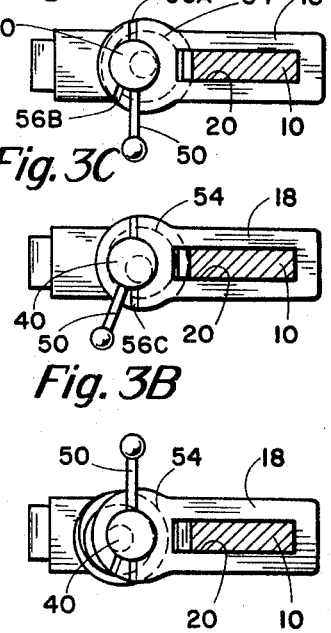
Fig. 3C
Fig. 3B
Fig. 3A
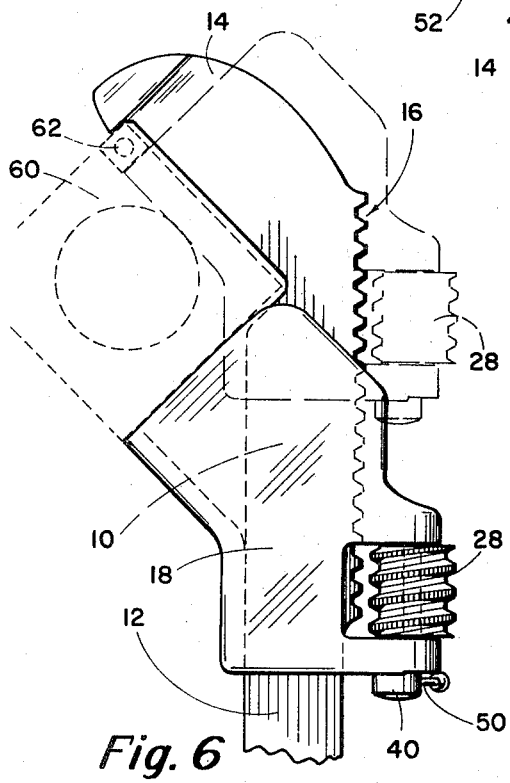
Fig. 6

3,868,875

QUICK ADJUSTABLE WRENCH

BACKGROUND, SUMMARY AND OBJECTS OF THE INVENTION

Adjustable jaw wrenches are commonly used tools. The most frequently employed method of adjusting a movable jaw relative to a fixed jaw portion of a wrench is by use of a threaded member. Threadably positioning of one jaw relative to a fixed jaw has the advantage that the spacing between the jaws can be completely variable so as to fit any size member up to the maximum acceptable by the wrench design.

One disadvantage of the threadably positioned jaw wrench is that it is fairly time consuming to move the movable jaw when a large degree of spacing change is required, that is, when moving the jaw to fit a very large nut down to the spacing required to fit a very small nut, or vice versa.

Others, working to overcome this disadvantage, have provided means for rapidly adjusting threadably positioned variable jaw wrenches. Such arrangements may be seen in U.S. Pat. Nos. 1,652,977; 1,106,557; 1,362,413; 1,136,539; 999,988; and 872,955. The present invention relates to improvements in rapidly adjustable variable positionable jaw wrenches of the type described in the above referenced patents. Particularly, the present invention is directed towards means not only of rapidly positioning an adjustable jaw wrench but including means of locking the wrench in the selected position.

It is therefore an object of this invention to provide an improved quick adjustable wrench.

More particularly, an object of this invention is to provide a quick adjustable wrench including means wherein one jaw of the wrench may be rapidly positioned relative to a fixed jaw and in which the final spacing between the jaws is achieved by threaded engagement of one portion of the wrench is locked in the selected position.

Another and more particular object of this invention is to provide a quick adjusting wrench including a three positioned lever in which, in the first position, the wrench may be rapidly adjusted from one size to the next; in the second position the wrench may be threadably adjusted to the desired spacing between the jaws; and in the third position the wrench is locked into the selected position.

These objects, as well as other and more specific objects of the invention will be fulfilled in the following description and claims, taken in conjunction with the attached drawings.

DESCRIPTION OF THE VIEWS

FIG. 1 is a side view of a wrench embodying the invention.

FIG. 2 is a top view of the wrench of FIG. 1.

FIGS. 3A, 3B and 3C are cross-sectional views taken along the line 3—3 of FIG. 1.

In FIG. 3A the wrench is in the rapidly adjustable position; in FIG. 3B the movable jaw of the wrench may be threadably positioned relative to the fixed jaw; and in FIG. 3C the movable jaw of the wrench is locked in position relative to the fixed jaw.

Figure 4:
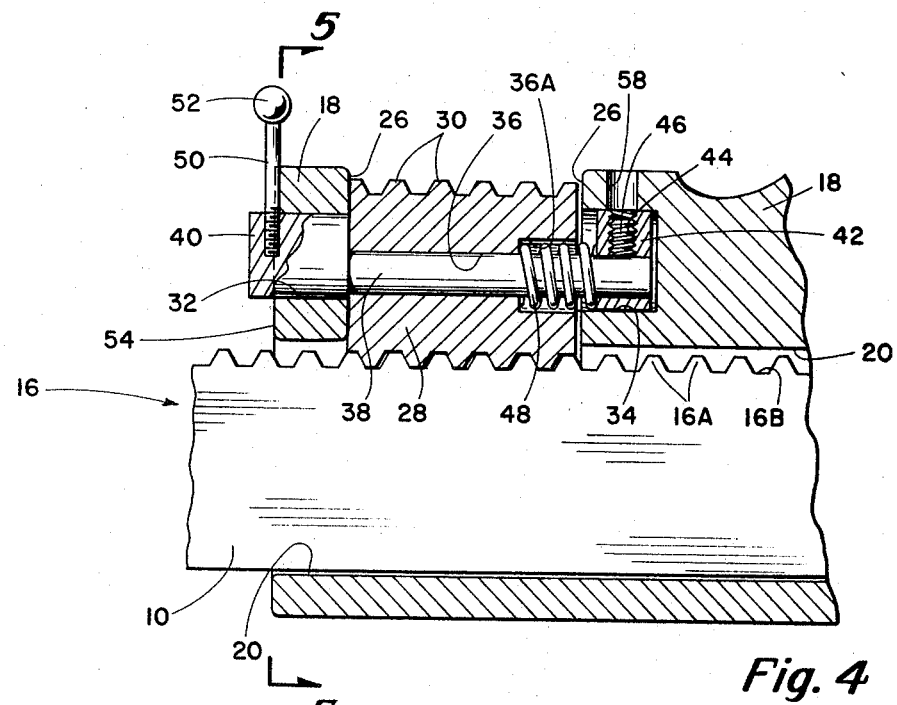

FIG. 4 is an enlarged cross-sectional view taken along the line 4—4 of FIG. 2 and showing details of one means of providing the three position quick adjustable wrench of this invention.

Figure 5:
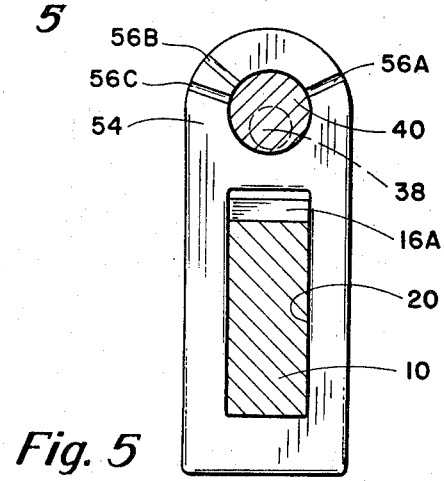

FIG. 5 is a cross-sectional view taken along the line 5—5 of FIG. 4 with the shaft lever not being shown.

FIG. 6 is a partial side view of an alternate embodiment of the invention wherein the rack portion of the wrench body is on the side of the wrench opposite the fixed jaw and showing the movable jaw in different positions for engaging two different sizes of square nuts.

FIG. 7 is a view of an alternate embodiment of the wrench as shown in FIG. 6 and showing the arrangement wherein the eccentric shaft is extended to be more easily engaged by the thumb of the user without taking his hand from the wrench handle.

Figure 8:
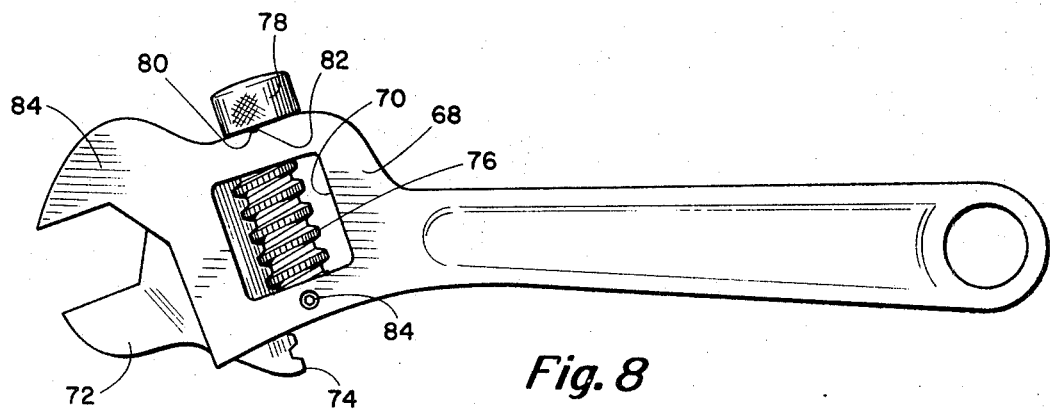

FIG. 8 is a side view of an additional alternate embodiment of the invention.

DETAILED DESCRIPTION

Referring now to the drawings and first to FIG. 1, the wrench includes a body 10 having a handle portion 12 and an opposed fixed jaw portion 14. The body 10 also includes a rack portion 16 which may be, as illustrated, integrally formed with the body, the rack portion providing spaced-apart teeth 16A. Between the teeth 16A are valley floors 16B. Each floor 16B has an irregular or knurled surface, as shown in FIG. 2.

A movable jaw 18 is slidably positioned on the wrench body 10. As shown in FIG. 3A the movable jaw 18 includes an opening 20 which slidably receives the wrench body 10. The movable jaw 18 has a working face 22 which is opposed to a working face 24 on the fixed jaw 14. Members to be rotated such as nuts, bolts, etc., by the wrench, are engaged between the faces 22 and 24.

The movable jaw 18 has a notch area 26 therein opposite the body rack portion 16. Rotatably positioned in the notch area 26 is a worm 28 having a spiral thread 30 thereon. In one position of the wrench the thread 30 of worm 28 engages the teeth 16 of the body rack portion. By rotation of the worm 28 when the teeth are in engagement with the rack portion 16 the movable jaw 18 may be threadably positioned relative to the fixed jaw 14.

Referring to FIG. 4, the details of means whereby the worm 28 is rotatably supported is best shown. The movable jaw 18 includes an opening 32 in the rearward portion thereof, and spaced apart from it on the opposite side of notch 26 is an opening or recess 34. The openings 32 and 34 are in axial alignment. The worm 28 has an axial opening 36 therethrough. Extending between the body openings 32 and 34 and within the opening 36 is an eccentric shaft. The eccentric shaft includes an intermediate small diameter portion 38 and a large diameter portion 40 on the rearward end thereof. It can be seen that the portions 38 and 40 may be formed of one piece or separately formed and secured to each other. The large diameter portion 40 is rotatably positioned in the opening 32 in the movable jaw while the small diameter portion 38 is rotatably received in the opening 36 in worm 28. An eccentric bushing 42 is secured to the forward end of eccentric shaft 38 and is rotatable in recess opening 34. The bushing 42 includes a radial threaded opening 44 which receives a set screw 46 by which the bushing is secured to the eccentric shaft 38.

The worm opening 36 has an enlarged internal diameter portion 36A at the forward end thereof. Positioned around the eccentric shaft 38 in the opening 36A is a compression spring 48. The spring is compressed between bushing 42 and worm 28. The compressive force of spring 48 pushes worm 28 into firm contact with the rearward surface of notch 26 in the movable jaw.

Radially extending from the eccentric axis rearward large diameter portion 40 is a shaft lever 50, at the outer end of which is provided a ball 52. The movable jaw rearward surface 54 is provided with three indentations as shown best in FIG. 5, marked 56A, 56B, and 56C. The indentations receive shaft lever 50 so as to retain it in one of three selected positions. With the shaft lever 50 in indentation 56A the eccentric shaft 38 is positioned such that the threads 30 on worm 28 are out of contact with the threads 16A of the body rack portion. This is illustrated in FIG. 3A. Thus, with the shaft lever 50 in the indentation 56A the movable jaw 18 may be freely slidably positioned relative to the body 10 so as to permit quick adjustment of the spacing between the jaw's surfaces 22 and 24.

With the shaft lever 50 in indentation 56B the eccentric shaft 38 is rotated such that the threads 30 on worm 28 engage the threads 16A on the rack portion of the wrench body. In this position the spacing between the surfaces 22 and 24 of the wrench jaws may be threadably adjusted by rotation of the worm 28. This permits final accurate adjustment of the wrench. This position is shown in FIG. 3B. Spring 48 insures contact between the worm 30 and the rearward surface of notch 26 in the movable jaw so that while in the position of identation 56B worm 28 is rotatable but is not easily inadvertently rotated out of the selected position.

With the shaft lever 50 in indentation 56C, as shown in FIG. 3C, the eccentric axis 38 is rotated such that the spiral thread on worm 28 is forced to the maximum downward position within the teeth 16A of the body ratchet portion. The maximum diameter surface of tooth 30 on worm 28 is provided with an irregular surface, such as by knurling, as shown in FIGS. 1 and 2. The knurled thread of worm 28 contacts the irregular valley floor surfaces 16B between rack portion teeth 16. Thus in the third position the spacing between the jaws of the wrench cannot be inadvertently changed regardless of rough handling of the wrench.

Thus the wrench provides three modes, that is, a first fast positioning mode (FIG. 3A), a second threadably positioning mode (FIG. 3B), and a third locked positioned mode (FIG. 3C). The three modes and easily selected by the rotation of the eccentric axis 38 by the use of the shaft lever 50. The user may move the shaft lever by thumb action without removing his hand from grip about the handle portion 12. The compression spring 48 urges the shaft lever 50 towards the body rearward surface 54 so as to retain shaft lever 50 in the selected indentation 56A, 56B or 56C. Thus spring 48 serves the dual purpose of first, imparting frictional engagement between the worm 28 and the movable jaw 18 so that in the second mode the worm is rotatable but is not easily inadvertently rotated, and second, the spring 48 retains the shaft lever 50 in the selected indentation.

To facilitate assembly of the wrench an opening 58 (See FIGS. 2 and 4) is provided in the movable jaw 18. The set screw 46 may be engaged by an allan wrench to firmly contact eccentric shaft 28 through the opening 58.

The embodiment set forth in FIGS. 1 through 5 is merely exemplary of the invention. The particular configuration of the wrench body, the fixed jaw portion and the movable jaw portion are not limited by the invention. As an example, FIGS. 6 and 7 show an alternate arrangement in which the rack portion 16 is on the opposite side of the body 10 from the jaw. Otherwise, the arrangement of FIGS. 6 and 7 is the same as described for the wrench of FIGS. 1 through 5. FIG. 6 shows in solid outline the wrench adjusted to engage and rotate a large square member 60 and in dotted outline the position of the movable jaw relative to the body to engage a small square member 62.

FIG. 7 shows an alternate arrangement of the wrench of FIG. 6. In this arrangement the eccentric shaft 38 is provided with a rearward extension 64. This arrangement permits the user to readily adjust the mode of the wrench without moving his hand from the rearward portion of handle 12. A detent pin 66 engages the indentations in the rearward surface 54 of the movable jaw so as to retain the eccentric axis in the selected mode.

FIG. 8 shows another alternate embodiment of the invention. In this embodiment the body portion 68 of the wrench is provided with an opening 70. The movable jaw 72 includes a rack portion 74. The worm 76 is rotatably supported to the wrench body portion 68. The eccentric axis (not seen) is rotatably positioned by a knob 78 having a detent portion 80 thereon which engages one of three indentations 82 (only one of which is shown in FIG. 8). Knob 78 is positionable in three different modes so that in the first mode the movable jaw 72 is quickly adjustable relative to fixed jaw 84. In the second mode the movable jaw 72 is threadably adjustable by rotation of the worm 36; and in the third mode the movable jaw is held in nonadjustable position in that the worm 76 is nonrotatably engaged with the movable jaw rack portion 74. The internal arrangement of the embodiment of FIG. 8 is the same as that illustrated in FIG. 4. The opening 84 permits the adjustment of the set screw to secure the bushing to the eccentric axis as described relative to FIG. 4.

The embodiments illustrated in FIGS. 1, 6, 7 and 8 are exemplary of the wide variety of configurations which the invention may employ. It is understood that the invention is not to be limited to the embodiments set forth herein for purposes of exemplification, but is to be limited only by the scope of the attached claim or claims, including the full range of equivalency to which each element thereof is entitled.

What is claimed is:

1. A quick adjustable wrench comprising:
   a body having a handle at one end and a fixed jaw at the other;
   a movable jaw slidably supported to said body providing movable spacing with said fixed jaw to receive variable sized members therebetween;
   a rack portion formed on one or the other of said body and said movable jaw, the rack portion having spread-apart teeth, the floors of the valley areas between the teeth having irregular surfaces;
   a rotatable eccentric axis supported by the other of said wrench body and said movable jaw, the axis being parallel to said rack portion;
   a worm member rotatably supported by said eccentric axis, the worm member having a spiraled thread thereon, the outer surface of the thread being irregular; and means for rotatably positioning said eccentric axis to three positions, in the first position the thread of said worm member being out of engagement with said rack portion whereby said movable jaw may be rapidly positioned relative to said fixed jaw, in the second position the thread of said worm member engaging the teeth of said rack portion whereby said movable jaw may be positioned relative to said fixed jaw by the rotation of said worm member, and in the third position the worm member being fully positioned towards said rack portion, said irregular outer surface on the worm member thread engaging the irregular floors of the valley areas between said teeth of said rack portion whereby said worm member is prevented from rotation to thereby lock said movable jaw relative to said body portion.

2. A quick adjustable wrench according to claim 1 wherein said rack portion is formed on said body and said eccentric axis and said worm member are rotatably supported to said movable jaw.

3. A quick adjustable wrench according to claim 2 wherein said rack portion and said fixed jaw are formed on the same side of said body portion.

4. A quick adjustable wrench according to claim 2 wherein said rack portion is formed on said body opposite the side of said fixed jaw.

5. A quick adjustable wrench according to claim 1 wherein said rack portion is formed on said movable jaw and said eccentric axis and said worm member are rotatably supported to said body.

6. A quick adjustable wrench according to claim 1 including:

an eccentric axis positioning member affixed to said means for rotatably positioning said eccentric axis to said selectable positions, the eccentric axis positioning member having a detent portion thereon.

7. A quick adjustable wrench according to claim 6 wherein the eccentric axis positioning member rotatably supporting said eccentric axis has detent indentations in one surface thereof arranged to receive said positioning member detent portion of said three selectable positions of said eccentric axis.

8. A quick adjustable wrench according to claim 1 including:

resilient means for retaining said eccentric axis in selectable positions.

9. A quick adjustable wrench according to claim 7 including:

a spring resiliently urging said eccentric shaft in a rearward direction to resiliently retain said shaft lever in said detent recesses.

10. A quick adjustable wrench according to claim 1 wherein said eccentric axis positioning member rotatably supporting said eccentric axis has a notch area therein having a forward and rearward surface, said worm member being rotatably supported in the notch area, the wrench portion having concentric openings in the forward and rearward surface of said notch area, and wherein said eccentric axis has a smaller diameter intermediate portion rotatably receiving said worm member and an eccentric larger diameter rearward portion rotatably received in said opening in said notch area rearward surface and including:

a bushing rotatably received in said opening in said notch area forward surface, the bushing having an eccentric axial opening therein nonrotatably receiving said eccentric axis intermediate portion, the bushing and said eccentric axis enlarged diameter rearward portion being concentric.

11. A quick adjustable wrench according to claim 10 wherein said bushing has a radial threaded opening therein intersecting said eccentric axial opening, and including:

a set screw received in said threaded opening engaging said eccentrix axis intermediate portion received in said axial opening to nonrotatably support said bushing to said eccentric axis intermediate portion.

12. A quick adjustable wrench according to claim 9 wherein said worm member has an axial opening therein rotatably receiving said eccentric axis intermediate portion, and wherein the opening includes an enlarged internal diameter portion adjacent said bushing, and including:

a spiraled spring compressibly received about said eccentric axis intermediate portion and within said worm member enlarged internal diameter opening one end of the spring engaging said worm member and the other end engaging said bushing.

* * * * *